Sept. 28, 1937.    F. APPELIUS ET AL    2,093,988
MEASURED SERVICE TELEPHONE SYSTEM
Filed July 27, 1935    4 Sheets-Sheet 1

INVENTOR.
FRITZ APPELIUS
HEINRICH LANGNER
BY
ATTORNEY.

Sept. 28, 1937.   F. APPELIUS ET AL   2,093,988

MEASURED SERVICE TELEPHONE SYSTEM

Filed July 27, 1935   4 Sheets-Sheet 2

INVENTOR.
FRITZ APPELIUS
HEINRICH LANGNER

BY

ATTORNEY.

FIG. 4

Patented Sept. 28, 1937

2,093,988

UNITED STATES PATENT OFFICE 2,093,988

MEASURED SERVICE TELEPHONE SYSTEM

Fritz Appelius, Berlin-Spandau, and Heinrich Langner, Berlin-Steglitz, Germany, assignors to Telephon-Apparat Fabrik E. Zwietusch and Company, Berlin, Germany Application July 27, 1935, Serial No. 33,476
In Germany July 31, 1934

19 Claims. (Cl. 179—6.3)

The subject matter of the present invention is a pay station with automatic payment control for local and short distance calls, the payment of the fee being controlled by an operator in the case of long distance calls.

In order to accomplish an automatic payment control in short distance calls it is known to transmit impulses to the exchange corresponding to the fee paid in, before commencing to dial, whereby a switch is set corresponding to the fee paid. A second switch is set in the exchange by dialling the characterizing digit defining the call zone, and the setting of this switch must correspond to the setting of the switch set by the fee impulses.

If it is desired to use a pay station equipped for short distance calls also for long distance calls, difficulties arise since for the supervision of the fee payment by an operator audible signals are used as being most suitable, these being produced by the insertion of coils at the pay station. The long distance call is effected in the known way in that after applying for the call the pay station is called by the distant exchange and only then is the calling party asked to pay the fee. The controlling impulses evoked by the insertion of coins for short distance calls can only be utilized for fee control in long distance calls by considerable switching complication, since the settting up of long distance calls is different from the setting up of short distance calls.

It has already been proposed to provide switching devices in the exchange repeater associated with the pay station, by which the necessary audible signals are produced with the help of relay buzzers controlled by the fee impulses.

Such additional devices are avoided by the present invention. This is achieved according to the invention in that the line between the pay station and the exchange terminates, at both ends, in switch over contacts which become operative on the commencement of dialling, and in the pay station, switch over the line from the impulse transmitting device for payment signalling, to the dialling device and hand set; and in the exchange switch over the line from the fee impulse receiving devices to the selectors. This switching process has a number of further advantages. By the switching over, all the numerous switching devices necessary for supervising the fee control and operating condition of the system are disconnected from the line during the conversation and thus the connection between pay station and exchange is made as free as possible from attenuation.

In order to simplify the service in pay stations the switching over device in the pay station is made dependent upon an auxiliary magnet whose operation is in turn dependent upon switching conditions in the exchange. By these means the moment for inserting the fee for a local short distance call can be left to the calling party. It is merely necessary to insert the fee before commencing to dial, it being immaterial whether the receiver has already been removed or not. Since it is necessary to be able to pay the fee in different kinds of coins switches are provided in the exchange for each kind of coin. It would be desirable to use a single switching device which, on the insertion of a coin of higher value, would be displaced by a number of switching steps corresponding to the number of coin units to which the more valuable coin is equivalent. The solution of this problem, however, involves difficulties. Special coin storing devices must be provided in the pay station from which the coins are released after a sufficient interval of time whereby in the case of a more valuable coin, a larger number of controlling impulses, corresponding to the number of units to which the coin is equivalent, can be transmitted for setting the switching device in the exchange. From practical considerations, however, the devices in the pay station must be kept as simple as possible. A simplification of the devices in the pay station quite justifies an increased expenditure of switching devices in the exchange since the supervision and attendance then takes place at a central position. The use of several switching devices in the exchange for characterizing the number of inserted coins of each kind necessitates a translating device in which the total value of the fee inserted in terms of the unit fee is characterized. According to the invention an auxiliary selector is used for the addition and translation of the fee which is characterized in various coins, this selector taking up successively the settings of the individual payment selectors while at the same time translating the setting of the payment selector indicating high value coins, by being set according to the number of complementary steps of these selectors. The auxiliary selector effecting the totalling and translation is combined according to the invention with the discriminating selector characterizing the zone to form an assembly which is only necessary during the setting up of the call and thus, in order to decrease the number of devices in use in the exchange, is only temporarily brought into connection with the switching devices of the calling station.

For the purpose of control it is necessary to provide separate call meters for local and short distance calls. The control of long distance calls is insured by the preparation of call tickets. The control of the local payment meter can take place in the usual way. On the other hand the setting of the meter for short distance calls must take place in dependence upon the value of the call set up. The value of such a call is given by the setting of the fee selector which is set in the exchange by the insertion of the coins. The setting of the short distance meter must, however, take place in units. The auxiliary selector effecting the translation and totalling characterize the value of the call only through the number of the fee selectors which is complementary to their setting. Moreover, it should be noted that the auxiliary selector is only switched on to the connection for a short time and only serves to ascertain whether the fee corresponding to the zone dialled has been inserted. After establishing this the selector has fulfilled its purpose and can be released for other calls. The displacement of the short distance meter should not take place, however, until the called subscriber replies. It is thus necessary that the criterion of the value of the call set up recorded in the totalling and translating selector should be recorded in a switching device which is associated with the calling station during the whole duration of the call.

According to the invention a fee selector corresponding to one kind of coin is provided for this purpose, after which giving up its setting corresponding to the value of the inserted coins steps to the normal position and is set afresh corresponding to the total value of the inserted fee in coin units. In order to make the controlling operations as simple as possible this selector is not set on the step corresponding to the total fee, but on the corresponding complementary step which corresponds to the complementary step number of the inserted fee. Thus, when on the reply of the called subscriber this previously set selector is brought to the normal position, the short distance meter is also displaced by the number of steps corresponding to the number of complementary steps. In order to achieve this result the complementary value of the inserted coins, which is contained in the adding and translating selector, is first transmitted to a further auxiliary selector whose setting then corresponds to the total fee actually inserted. From this second auxiliary selector is effected the transference of the complementary steps to the selector permanently associated with the calling station, which thereby contains the necessary complementary step number.

An embodiment of the invention will now be described with reference to the drawings.

Figures 1, 2:
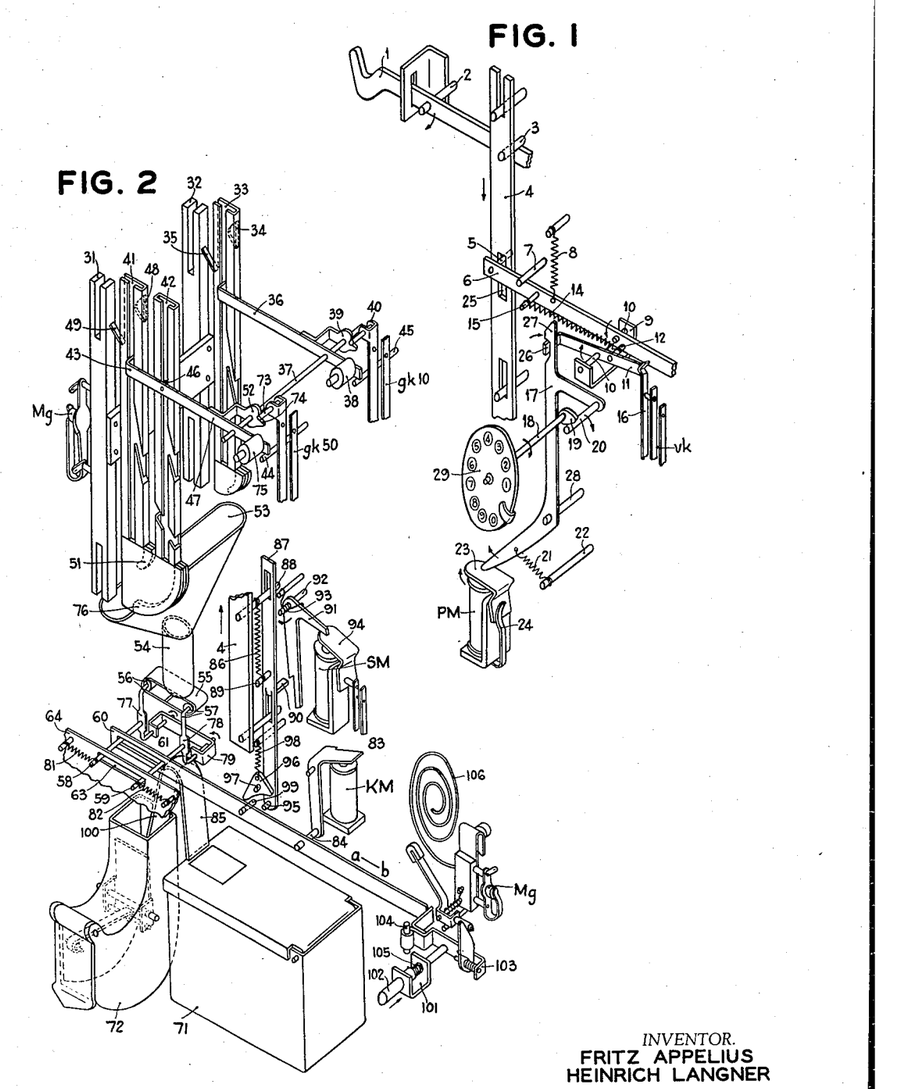
Figs. 1 and 2 represent a diagrammatic perspective view of the mechanical construction of the pay station.

The devices of Fig. 1 will be considered before those of Fig. 2. For the sake of clearness these parts are illustrated separately.

In Fig. 1, I represents the receiver switch hook, which can rotate about the axle 2 in the direction of the arrow. The position illustrated is that obtaining when the receiver is in place. By means of its projecting portion the switch hook I engages under a pin 3 which is fastened to a lever 4. The lever 4 is represented as being broken off, the lower end of it being seen again in Fig. 2.

Figure 3:
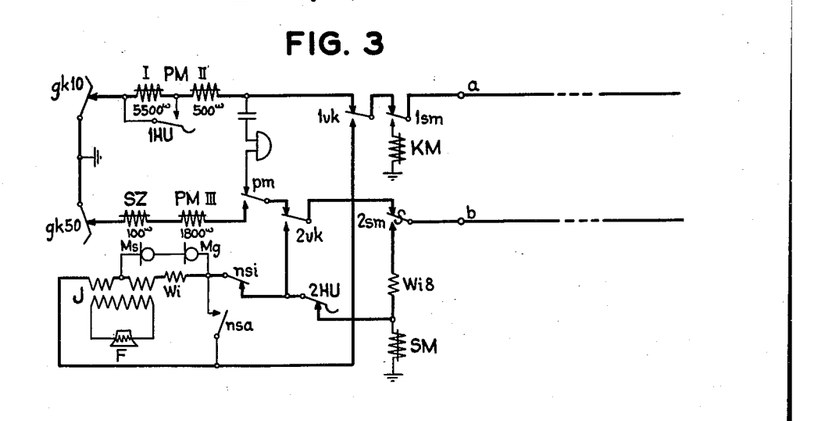
Fig. 3 shows the circuit arrangement of the pay station.

On releasing the switch hook the lever I rotates and causes the lever 4 to move in the direction of the arrow. Through the lowering of lever 4, lever 6 is rotated in the direction of the arrow about axle 10 which is fixed in the fixed member 9, the rotation being carried out against the pull of spring 8. Lever 6 engages by means of the pin 5 in a slit 25 of lever 4. Also lever 11 rotates about the axle 10. A pin 12 is attached to lever 11 to which is connected a spring 14 which is attached to lever 6 by means of the pin 15. Spring 14 has the effect of rotating lever 11 in the opposite direction to the motion of lever 6 when the latter is caused to rotate by the removal of the receiver. Lever 11 switches over the contact set *vk* whose individual contact springs are indicated in Figure 3, by *1vk* and *2vk*. This contact set represents the switching over position in the pay station which was mentioned in the introduction to the description. The motion of lever 11 under the influence of lever 6 is restricted by a nose 27 on lever 17 which bears against the right angle projection 26 of lever 11. Lever 17 rotates about axle 28, and is pressed against the armature 23 of a magnet PM. The armature spring 24 of magnet PM is adjusted so that when the armature 23 releases, the lever 17 rotates in the direction of the arrow in opposition to the pull of spring 21, and thus the nose 27 is lifted away from the projection 26. Rotation of this lever 17 in the same direction can also take place by the operation of the dial 29.

On the shaft 18 of the dial 29 a cam 19 is fixed which engages with pin 20 on lever 17, and on operating the dial 29 moves the pin 20 in the direction of the arrow, thus releasing lever 11. Thus when the magnet PM is deenergized the contact set is immediately switched over on removing the receiver. If, however, magnet PM is energized the contact set *vk* remains in its initial condition on removing the receiver until, on operating the dial, the locking of lever 11 is removed by lever 17.

In order to make Fig. 1 as clear as possible the further contact sets, which are operated by the switch hook I, are omitted. The same applies to the contacts operated by magnet PM.

Fig. 2 shows the channel and collecting system. The coin channels are indicated by 33, 41 and 42. The apparatus is designed for use with the German coins such as 10 pfg., 50 pfg., and 1 mark. It should be understood, however, that it may also be operated by any of three different coin units if desired without changing the principle of operation. Channel 33 is provided for the 10 pfg. pieces. By means of the diverting strips 34 and 35 the coin proceeding through channel 33 is thrust against the gong 32. In its further passage it comes into contact with the projection of lever 36, which projects through into the channel 33. Under the influence of the weight of the coin the lever 36 is rotated about its axle 37. Lever 36 is counterbalanced by the weight 38. To lever 36 is also attached a cam-like projection 39 which bears on the roller 40 of the coin contact for 10 pfg. pieces,—*gk*10. A slot is made in channel 33 so that the lever 36, on being depressed by the coin can swing around out of the channel. The rotary motion of the lever 36 is so adjusted that contact *gk*10 is opened once by cam 39. The coin proceeding through the channel 33 passes through the collecting funnel 53 to a receptacle 54 from which, depending upon whether the call is set up or not, it passes either to the receiving box 71 or the returned coin receptacle 72. Channel 41 is provided for 1 mark pieces, which are thrust twice against the gong by means of the strips 48 and 49 and the terminal guide 51. The projection 43 of lever 47 projects into the coin channel 41, and pin 46 attached to the same lever projects into channel 42. The contact set gk50 is operated by lever 47 by means of cam 52 associated with the lever. By loading the lever 47 with a one mark piece the rotation of the lever which is thereby caused is sufficiently large for the roller 73 of the contact set gk50 to pass over the apex 74 of cam 52 so that when the lever 47 swings back under the influence of its counterweight 75 the contact set gk50 is operated a second time by the apex 74 of cam 52. Thus on inserting a one mark piece the contact set gk50 is opened twice, and the gong is struck twice, with a sufficient time interval in between.

On the insertion of a 50 pfg. piece, which passes through channel 42, the lever 47 is only rotated to such an extent that the roller 73 does not pass over the apex 74 of cam 52. Thus only one operation of the contact set gk50 takes place. The gong 31 also is struck only once by the 50 pfg. piece for the coin is thrust only once against the gong 31 by the terminal guide 76. The inserted coins are then collected in the receptacle 54, the bottom of which is formed by a slide-like structure. The slide consists of a strip forming an endless band which passes over rollers 56 and 57. The rollers 56 and 57 are carried on bent levers 77 and 78 which are fixed to the fixed member 79. The levers 77 and 78 carry rods 58 and 59 which project through a slit 61 in a lever 60. The rods 58 and 59 also pass through the slot 63 in a fixed plate 64. The rods 58 and 59 are held in the position shown by springs 81 and 82 attached to the fixed plate 64. Lever 60 engages with the collecting magnet KM. The magnet has a pin 84 fixed to its armature 83, and this engages with the lever 60. Thus when the magnet KM energizes lever 60 is moved in the direction of the arrow a. The result of this is that, by means of lever 60, pin 59 is moved against the action of spring 82. Lever 78 is thereby rotated in the direction of the arrow. Lever 77 does not change its position by the motion of lever 60 in direction a. The effect of the rotation of lever 78 is that the slide 55 is given an inclined position so that the coin present in the receptacle 54 moves via the slide 55 and the chute 85 into the coin box 71. On replacing the receiver the bar 4 is moved in the direction of the arrow. At the same time, as will be described later in the switching operations with reference to Fig. 3, the locking magnet SM is energized, and remains energized until the connection is released in the exchange. During this releasing period the collecting magnet KM can energize, provided that the call has been set up, and the coins can be collected in the receptacle 54.

If the call is not set up the coins present in the receptacle 54 are returned to the calling party on replacing the receiver. Lever 4 is connected by a spring 86 to a lever 87. The spring 86 is attached to lever 4 by means of a pin 88 and to lever 87 by means of a pin 89. A tongue 90 is bent out from lever 87 and can engage with a locking lever 91. This lever 91 is rotatable about an axle 92 and is rotated by spring 93 in the direction of the arrow, so that lever 91 tends to bear against the projection 90 of lever 87. The other end of lever 91 rests on the armature 94 of magnet SM which has associated with it a strong armature release spring. When the magnet is not energized the armature 94 causes lever 91 to take up the position shown. When the armature is pulled up, however, lever 91 is pulled round by spring 93 and bears against the tongue 90 of lever 87, so that the latter cannot follow the motion of lever 4 when this lever moves in the direction of the arrow. As soon as magnet SM deenergizes, however, the lever 87 follows the motion of lever 4 in the direction of the arrow, being actuated by the spring 86. On the upward motion of lever 87 the pin 95 carried by the lever comes into contact with lever 96, which can rotate about the axle 97, and is kept in the position shown by a spring 98. When the pin 95 presses against lever 96 the latter is rotated, and its other end engages with a pin 99 on lever 60 and consequently moves lever 60 in the direction of arrow b. The motion of lever 60 in the b direction causes lever 77 to rotate and thus swings round the slide 55 about the roller 57, so that the coins present in the receptacle 54 move via the chute 100 into the returned coin receptacle 72.

Since in the case of long distance calls the control of the collecting magnet KM involves difficulties, as was described in the introduction, the collecting is effected by the calling party by pressing a button 102. The button 102 is inserted in a fixed member 101 and bears against a lever 103 which can rotate about an axle 104. The end of lever 103 is in contact with lever 60, so that on pressing button 102, against the action of spring 105, lever 103 pushes lever 60 in the a-direction. The movement of lever 60 in the a-direction results, as already described, in the collection of the coins present in the receptacle 54. Through the rotation of lever 103 a gong is struck at the same time which indicates to the operator that the coins have been collected. The microphone Mg serves for transmitting the sound produced by the gongs 31, 32 and 106 for the purpose of payment supervision.

The circuits involved are divided into three parts.

Figure 4:
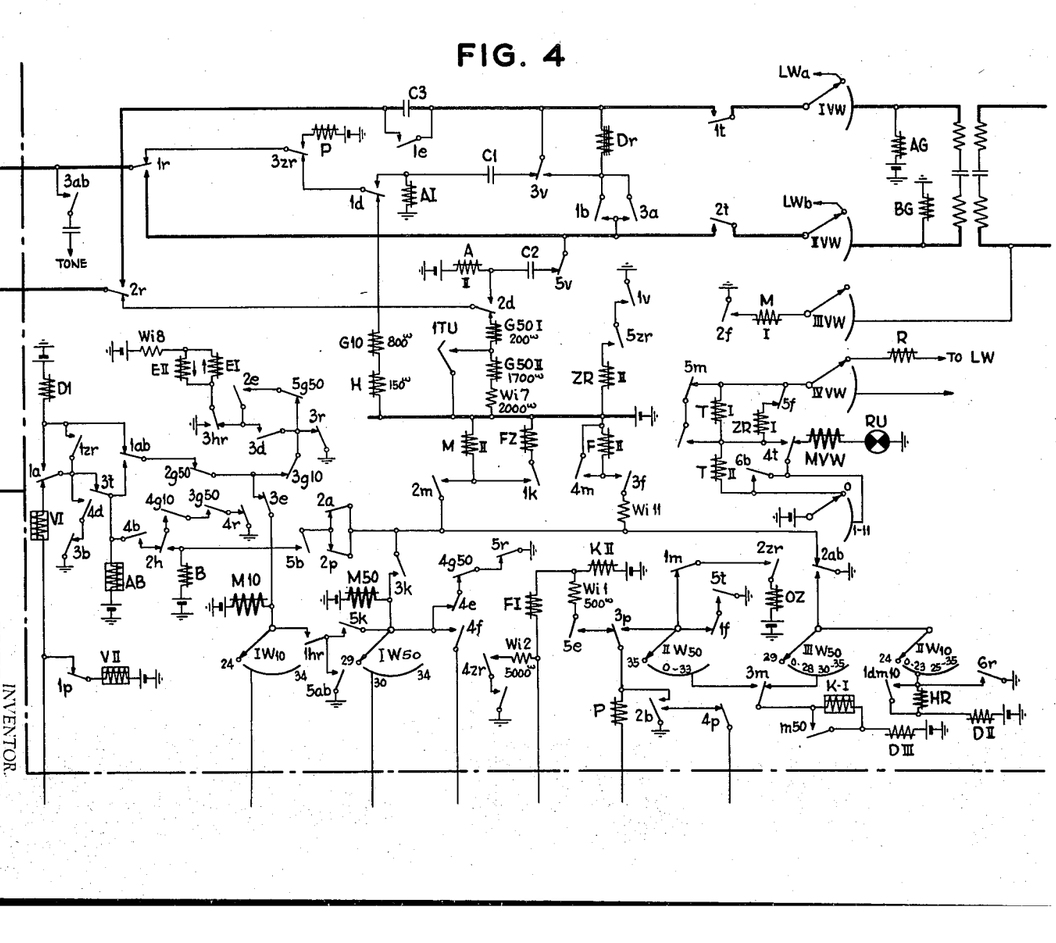
Figs. 4, 5, and 6 show the equipment located at the exchange.
Figure 5:
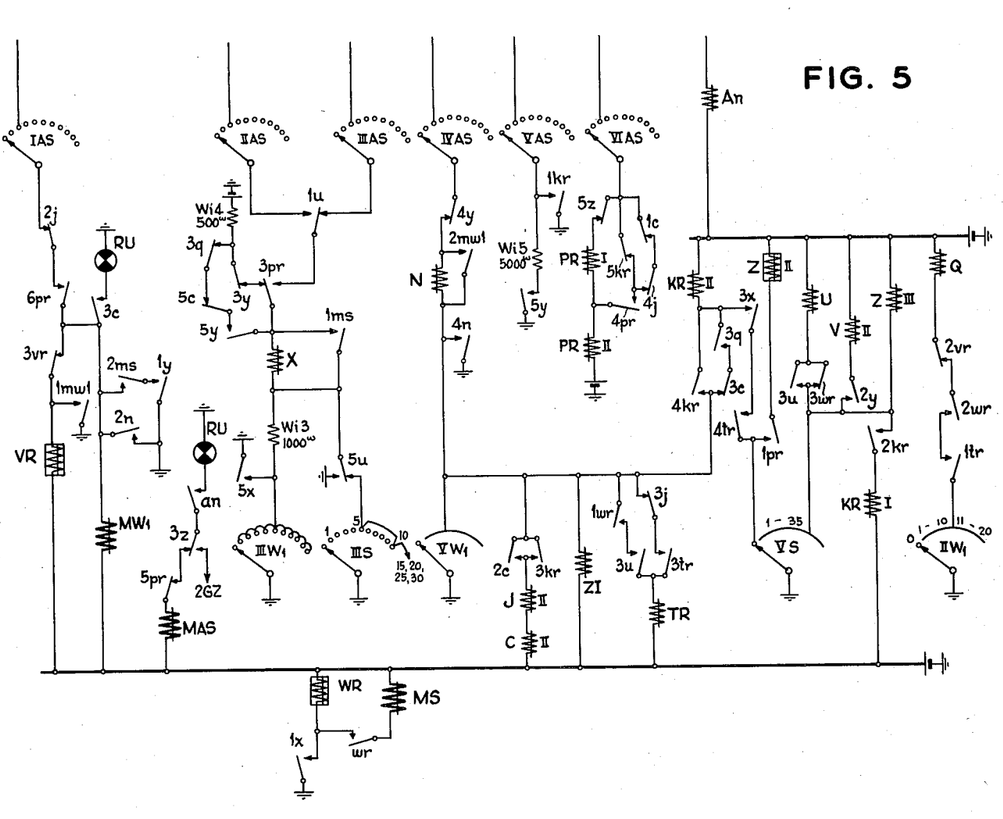
Figure 6:
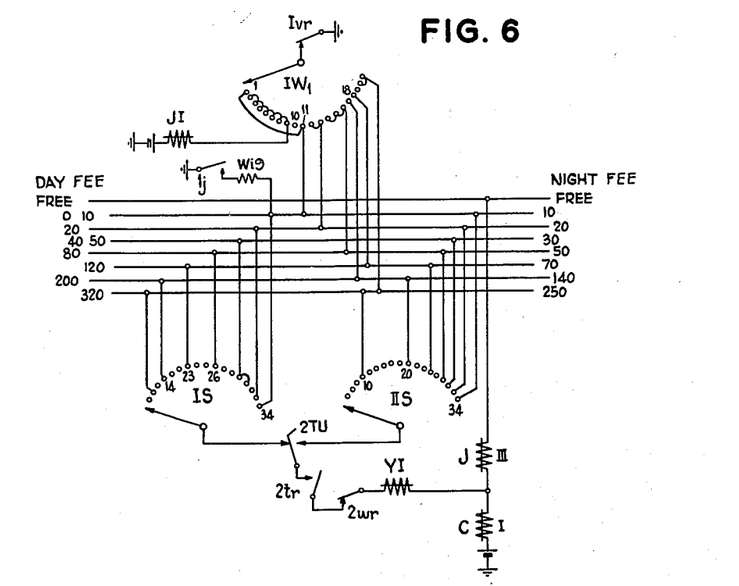

Fig. 3 represents the switching devices in the pay station,

Fig. 4 represents the switching devices in the exchange which are permanently associated with the pay station, and Figs. 5 and 6 represent the zone determining device for payment control which is only connected up during the establishment of the connection.

The windings of the individual relays are differentiated from one another by roman figures. The wipers of individual selectors are similarly differentiated by prefixed roman figures. The rotary magnets of the selectors are characterized by prefixing the letter M. The contacts of the relays and magnets are characterized by small letters and are differentiated by ordinary numerals. The contacts of the selectors are also characterized by ordinary numerals. Where the magnitude of the resistances is important for understanding the individual circuits the value in ohms is written beside the various resistances and relay windings.

The references of Fig. 3, which have not already been explained in connection with Figs. 1 and 2, have the following meaning:

nsi is the dial impulse contact, nsa is a dial off-normal contact, F is the receiver, Ms is the speech microphone, Mg is the gong microphone for payment supervision. HU represents the switchhook contacts. SZ is the visual signal by which the tariff available is indicated in the pay station. When energized the visual signal SZ indicates that the night tariff is available and thus that the corresponding fee reduction for short distance calls has set in.

The normal condition of the system will first be considered. A current flows over lines $a$ and $b$ to earth. Magnet PM is energized in the pay station, and in the exchange relays G10 and G50 are energized.

*Short distance call*

On setting up a short distance call the calling party must insert the fee corresponding to the zone to be dialled before dialling.

The case will be considered in which this fee amounts to RM 1.20. The calling party is at liberty to pay in the fee either in seven pfennig pieces and one fifty pfennig piece, or two ten pfennig pieces and one mark piece, or two ten pfennig pieces and two fifty pfennig pieces. The insertion of the money may occur either before or after the removal of the receiver.

As was described with reference to Fig. 2, contact $gk10$ is opened transitorily on each insertion of a 10 pfg. piece, while when a 50 pfg. piece is used contact $gk50$ is opened. The insertion of a one mark piece causes contact $gk50$ to be opened twice.

When a 10 pfg. piece is inserted the circuit over: earth, $gk10$, PM, line $a$, $1vk$, $1sm$, $1r$, $3zr$, $1d$, $g10$, and H is broken, so that relay G10 releases. Relay H could not energize on account of the high resistance of winding PMI, although G10 was energized. Through the release of relay G10 the rotary magnet M10 of the payment selector W10 is energized over contact $3g10$ for the purpose of registering the inserted 10 pfg. piece.

The counting of the 50 pfg. pieces is effected by payment selector W50, which possesses three wipers IW50, IIW50, and IIIW50. The selectors W10 and W50 have 34 contacts and one dummy contact. The contacts of selector W10 are wired so as to produce a rest position on contacts 24 and 35. Selector W50 has rest positions on contacts 29 and 35. The wiring of the selectors W10 and W50 defines the highest number of coins of one sort which can be inserted for setting up a call.

Thus in the embodiment, at the most nine 10 pfg. pieces and four 50 pfg. pieces can be inserted, which corresponds to a total fee of RM 2.90. The rotary magnet M10 for the payment selector W10 energizes in the following circuit: earth, $3r$, $3g10$, $3e$, M10, battery.

The rotary magnet M50 of payment selector W50 energizes one the insertion of a 50 pfg. piece or a one mark piece, through the deenergization of relay G50, over $5r$, $4g50$, $4e$, M50, battery.

On inserting two 10 pfg. pieces and a one mark piece as in the example to be considered, selector W10 is advanced from contact 24 to contact 26, and selector W50 from contact 29 to contact 31. By removing the receiver the high resistance winding PMI in the pay station is short circuited by the closing of switch hook contact 1HU, so that under the increased current thus produced relay H draws up. The energizing of relay H has to effect the seizure of a selector for setting up the connection, and the connection of the zone determining device. Relay H causes relay B to energize over contact $2h$ and the contacts $4g10$, $3g50$ and $4r$. Relay B locks up over its contact $5b$, and the contacts $2a$, $2p$ and $2ab$. The preselector VW is set in operation over contact $6b$ in that its rotary magnet MVW is connected to the relay interrupter RU over wiper 5VW, $6b$, $4t$, MVW.

On testing on a free first group selector GH relay T energizes in the pre-selector over wiper IV Vw. MVW is disconnected by contact $4t$. A line loop is set to the first group selector GW over $1b$, so that relays AG and BG energize in this selector. Independently of the seizing operation for connecting up a free group selector, a zone determining device is connected up over contact $2b$. Relay An energizes over $2b$ and $4p$. The rotary magnet MAS of the call finder AS of a free zone determining device is set in operation over contact $an$: earth, relay interrupter RU, $an$, $3z$, $5pr$, MAS, battery.

A testing circuit is set up over wiper VI of the call finder AS and contact $2b$. In the calling equipment relay P energizes, and relay PR energizes in the zone determining equipment. Through contact $5pr$ the rotary magnet MAS is disconnected and the call finder AS brought to rest. Relay An is disconnected by contact $4p$. Relays P and PR hold up over contacts $3p$ and $5t$ independently of relay T in the preselector. The independent seizure of the group selector GW and the zone determining device enables the time taken up by the seizing to be as small as possible. After the group selector and the zone determining device have been connected up, dialling can commence.

As has already been described with reference to Figs. 1 and 2, contacts $1vk$ and $2vk$ are switched over on operating the dial, since on removing the receiver the magnet PM was energized and remains energized till the commencement of dialling. By the switching over of contacts $1vk$ and $2vk$ relays G10 and G50 and also relay H are deenergized, since the earth is disconnected in the pay station and a loop is set up through contacts $1vk$ and $2vk$ over the speaking set of the pay station. By the release of relays G10 and G50, relay D is energized in the following circuit: earth, $3r$, $3g10$, $2g50$, $1ab$, DI, battery. The line from the payment control devices is switched over at contacts $1d$ and $2d$ on to the line passing over the selector to the first group selector. Relay A in the calling equipment energizes: earth, AI, $1d$, $3zr$, $1r$, $1sm$, $1vk$, speaking set, nsi, $2vk$, $2sm$, $2r$, $2d$, AII, battery. Over contact $3a$ relay A closes the loop for group selector GW, whose control relays AG and BG lock up independently of contact $3a$. As the dial is operated relay A is energized intermittently in synchronism with the dial impulses. The first group selector and the subsequent selectors are controlled over contact $3a$. The locking circuit for relay B is opened at contact $2a$ since contact $2p$ has already been opened on connecting up the zone determining device. Over contact $3d$ relay D causes the slow energizing relay E to energize. The slow to energize feature of relay E is necessary so that the controlling impulse for relays G10 and G50 produced by the switching over of contacts $1vk$ and $2vk$ in the pay station on account of the disconnection of the earth in the pay station can become operative for advancing the rotary magnets M10 and M50 without being shortened. The controlling impulse produced by the switching over is of no consequence by itself. It cannot, however, be dispensed with and its operation must therefore be fully insured. This additional displacement of the payment selectors W10 and W50 which is not produced by the insertion of a coin is provided for by the provision of the rest position in these selectors. On the release of relays G10 and G50 magnet M10 energizes over 3r, 3g10, 3e, M10 and battery, and magnet M50 over 5r, 4g50, 4e, M50 and battery. The magnets M10 and M50 are deenergized by the opening of contacts of relay E.

When the dial is operated relay A energized intermittently in synchronism with the dial impulses. On the first release of relay A relays V and VR energize over contact 1a in the following circuit: earth, 3b, 4d, 1a, V winding I, wiper IAS, 2i, 5pr, 3vr, VR, battery.

Over contact 1a the rotary magnet MW1 of the discriminator W1 is energized in synchronism with the impulses corresponding to the dialled number.

It will be assumed that the digits 2 to 9 in the first digit of a number characterize local calls, 0 characterizes short distance calls, and 1 calls without charge. The scale of charges for short distance calls is determined in the embodiment by the second digit. In the example assumed the characterizing number may be 08. After dialling the characterizing number 08 the wiper IW1 stands therefore on contact 18. Through the stepping of the discriminating selector W1 at the commencement of dialling the auxiliary selector S is set in operation in order to take up the criterion for the inserted coins given by the position of the payment selectors W10 and W50. The selector S is first set corresponding to the rest contact of selector W50. At the beginning of this switching operation selector W50 stands on contact 32 so that this selector has three steps remaining before reaching its normal position contact 35. Each step of selector W50 represents five payment units. So that the selector S shall execute a number of steps corresponding to the number of the rest contact of selector W50, in actual monetary units, the contacts of wiper IIIS of selector S are connected together at every fifth step. When taking over the complementary steps of selector W50 with simultaneous translation into payment units the following switching operations take place.

Relay X energizes over earth IIIW1, resistance Wi3, relay X, 3pr, 1U, IIAS, IW50, M50, and battery. Rotary magnet M50, however, remains deenergized. The slow release relay WR energizes over contact 1x. The rotary magnet MS for auxiliary selector S energizes over contacts 1x and wr. Contact 1ms of magnet MS short circuits relay X. Magnet M50 cannot energize, however, since the circuit contacts resistance Wi3. Relay X releases, the magnet MS is deenergized, and the auxiliary selector is advanced one step. This interaction is repeated until wiper IIIS has reached contact 5. Magnet M50 can now energize over: earth, IIIS, contacts 5, 5u, 1ms, 1u, IIAS, IW50, M50 and battery. When wiper IIIS steps to the next contact magnet M50 deenergizes. M50 again energizes when wiper IIIS reaches contact 10, and so on.

When wiper IW50 reaches contact 35 relay X remains deenergized. After relay X has been deenergized for a short time the delayed release relay WR also deenergizes, so that relay U energizes over earth, wiper V5, 3wr. Through contact 1u the payment selector W10 is now connected up for homing in synchronism with the auxiliary selector S. Contact 5u renders the resistance W13 inoperative, so that first relays X and WR can energize and then rotary magnet M10 in the following circuit: earth, 5u, 1m3, 3pr, 1u, IIAS, M10, battery.

Relay X and rotary magnet MS again operate as an automatic interrupter. Relay TR energizes over 3u, 1wr, VW1. Relay TR locks up over contact 3tr. As soon as W10 has reached contact 35 the selector S has taken over the number of complementary steps of the two payment selectors W10 and W50 and has simultaneously converted the steps of selector W50 into the payment units.

In the example considered the selector S is set on contact 23 (5×3=8). Contact 23 of wiper IS corresponds to a fee of RM 1.20, and is connected with contacts 18 of selector W1. Relay VR remained energized only during the transmission of the dialled impulses. After the transmission of the second impulse train relays Y and C energize therefore over their windings I over contacts 1vr, wiper IW1, contact 18, IS contact 23, 2tr, 2wr.

The energizing of relays Y and C forms the criterion for the payment of the fee for the selected short distance call. Relay F energizes through winding FI over contact 5y and the high resistance Wi5 and wiper VAS, while on account of resistance Wi5 relay K receives sufficient current to energize. Relay F locks up over winding FII and its contact 3f in dependence upon 2ab. Relay C locks up over its winding CII and contact 2c in dependence upon the discriminating selector W1 over VwI.

Through contact 3c the rotary magnet MWI is connected to the relay interrupter RU, so that the discriminating selector W1 moves to the zero position. Through VW1 the locking circuit for C on contact 0 is broken and magnet MW1 is brought to rest by the opening of contact 3c. Relay Y is held up over its winding YII and contact 2y in dependence upon wiper VS of auxiliary selector S. After the release of relay C, relay X energizes over contacts 5x, Wi3, relay X, contacts 5y, 5c, 3q, wi4, battery. Relay x and magnet MS again operate as an automatic interrupter so that the auxiliary selector S steps to the zero position.

On the homing of selector S the discriminating selector W1 is set afresh. It takes up the complementary steps of selector S. The rotary magnet MW1 energizes over 1y and 2ms in synchronism with the rotary magnet MS. During the homing of selector S relay TR is again energized, through the energizing of WR, over: earth, VW1, 1wr, 3u, TR, battery.

When selector S is in the normal position relay KR is energized over contact 0 of VS, contact 4tr and winding II of relay KR. Relay KR locks up over its contact 4kr in dependence of VW1. Through contact 3kr relay C is operated over winding CII in dependence upon wiper VW1. Since relay Z is energized over winding ZII, 1pr, wiper VS, in the normal position, relays PR and P are deenergized as soon as relays C and KR are energized. Contact 5z is opened as are also the contacts 5kr and 1c.

Through the homing of auxiliary selector S, the locking circuit for relay Y, over its winding YII and wiper VS, was broken. The payment selector W50 which is in the normal position, now takes up the complementary steps of selector W1 in the following circuit: earth, VW1, 4y, IVAS, 4f, M50, battery. Relay N thereupon energizes in this circuit. Rotary magnet MW1 is energized over contact 2n. Contact 2mw1 short circuits relay N so that M50 can energize. Both W1 and W50 take one step. Through the release of relay N, MW1 is deenergized. Relay N again energizes. The switching operations are repeated until W1 reaches the zero position. All the relays in the zone determining equipment are deenergized when selector W1 reaches the zero position.

When the called subscriber replies the position of selector W50 can be used for controlling the short distance call meter, since number of complementary steps exactly corresponds to the fee paid in monetary units.

The sum under consideration is 1.20 RM which was assumed to comprise two 10 pfg. pieces and two 50 pfg. pieces. The payment selector W10 is therefore stepped from contact 24 to contact 27 and the payment selector W50 from contact 29 to contact 32. The remaining steps of the selector W10 thus amount to 35−27=8, and the remaining steps of selector W50 amount to 35−32=3. The auxiliary selector is thus set on the contact corresponding to $3 \times 5(15) + 8 = 23$. Selector W50 takes up the complementary steps of selector W1, i. e. it is set on contact 23=35−12. The number of remaining steps of selector W50 is 12 which corresponds to the fee pair in of RM 1.20=12 of the monetary units.

When the called subscriber replies relay M energizes over 2f, winding M1, and wiper IIIVW, since metering potential is connected in the known way to the b-lead of the first group selector. Relay M locks up over 2m, and its winding MII, in dependence upon 2ab. The locking winding FII is short circuited by contact 4m so that relay F deenergizes. Relay K1 pulls up over earth 5t, 1f, IIW50, 3m, K1, DIII, battery. The rotary magnet M50 is energized through contact sk. Relay K is again short circuited at contact m50, so that the selector W50 makes one switching step. This interaction is repeated until the selector W50 has reached contact 34. (The starting position was contact 35.) Each time that relay K energizes the short distance meter FZ is advanced by one step over contacts 1k and 2m. The release of the connection is brought about by the replacement of the receiver in the pay station. The guarding magnet SM energizes over battery, AII, 2d, 2r, 2sm, 2vk, 2HU. The high resistance W18, is connected up through contact 2sm so that relay A cannot hold up in the circuit mentioned. Relay A releases and effects the release of the connection. The metering impulse is transmitted to the preselector over the c-lead in the known way, so that relay ZR can energize over winding ZR1 on account of the increased current produced. Relay ZR locks up over its contact 5zr in dependence upon relay V which was energized over earth, 3b, 4d 1a, VI, 1p, VII and battery, on the release of relay A. Contact 3zr connects the collecting potential to the a-lead so that the collecting magnet KM can energize over earth, KM, 1sm, 1r, 3zr, P and battery. In this circuit relay P also energizes and causes relay V to deenergize by means of contact 1p. Relay V is slow to release so that relay ZR is only deenergized by the opening of contact 1v after a definite lapse of time, so that the collecting potential is connected to the line over contact 3zr for a sufficiently long time. Through the disconnection of the group selector, relay T releases and brings the pre-selector to the zero position by the energizing of rotary magnet MVW over contact 4t and the relay interrupter RU. Through the release of relay T relay AB energizes over earth, 3b, 4d, 3t, AB and battery. Relay AB locks up over its contact 1ab in dependence upon relays G10 and G50. Contact 3ab connects an engaged buzzer to the line to the pay station. Contact 1ab causes relay D to deenergize and contact 2ab disconnects the current from winding II of relay M.

So that the payment selectors W10 and W50 shall be set on the necessary contacts 24 and 29 for setting up a new call relay K and winding III of relay D are energized over contact 2ab and wiper IIIW50 and 3m, and relay HR and winding II of relay D over wiper IIW10. Relay K and rotary magnet M50 in the one case, and relay HR and rotary magnet M10 in the other case operate as automatic interrupters until wiper IIIW50 has reached contact 20 and wiper IIIw10 has reached contact 24. During the stepping of selectors W50 and W10 relay D still remains energized over its windings DII and DIII. As soon as the selectors W10 and W50 reach contacts 24 and 29 relay D deenergizes, since the circuit for winding Dk over contact 1ab is already broken. As soon as earth is again connected to the a and b leads after the switching over of contacts 1vk and 2vk, relays G10 and G50 energize again. At contacts 2g50 and 3g10 the locking circuit for relay AB is broken. The original condition is now re-established. In the normal condition a current flows through relays G10 and G50.

Since the fees for short distance calls are variable according to the time of day, a tariff switch TU is provided in the exchange. By means of contact 1TU the high resistance winding G50II of relay G50 can be short circuited so that the visual signal SZ in the pay station receives sufficient current. Whether the visual signal is energized or not determines whether or not the day or night tariff is available. At the same time a switching over on to wiper IIS of the auxiliary selector S takes place by means of the tariff switch TU over contact 2tu, the contacts associated with wiper IIS being connected, in correspondence with the charge alteration, to the contacts of the discriminating selector W1.

*Disconnection of the zone determining device in the case on inadequate payment*

As already described relay TR was energized on the setting of the auxiliary selector S on the complementary contact corresponding to the fee paid, and locked up over contact 3tr in dependence upon VW1. After the second digit has been dialled in the case of a non-local call relay Q energizes over earth, wiper IIW1 contacts 11−20, 1tr, 2wr, 2vr. Relays Y and C only energize if the position of the discriminating selector W1 coincide with the position of the auxiliary selector S. Relay KR energizes through its winding KRII over contact 3q since contact 3c is in the normal position. Contact 1kr causes a strong current impulse to pass over wiper VAS so that relays F and K in the calling equipment draw up. Since the called subscriber has not yet replied and relay M is thus deenergized relay T is short circuited at contact 3k. The deenergizing of relay T effects the release of the connection. The homing of the preselector is controlled over contact 4t. Relays P and PR are caused to release by contact 5t. Through the deenergizing of PR the zone determining equipment is brought to the normal position, as already described. Over contact 2ab relays K and HR are energized over wipers IIIW50 and IIW10 which with the rotary magnets M10 and M50 act as automatic interrupter and advance the payment selectors W10 and W50 to positions 24 and 29. The engaged buzzer is connected to the line over contact 3ab.

Local calls

Before commencing to dial the local charge (10 pfg.) must be inserted. The payment selector W10 is taken to step 25 by the single opening of contact gk10. On commencing to dial selector W10 is moved from contact 25 to contact 20 as already described by the release of G10, conditional on the switching over of contacts 1vk and 2vk. Selector W50 also moves from contact 29 to contact 30. The zone determining devices (Fig. 5) have been connected up, as described, through contact 2b. The totalling switch S is set, by taking up the number of complementary steps of selectors W10 and W50, on contact 34, by making 5×5=25 steps on taking up the complementary steps of W50 and 9 steps on taking up the complementary steps of W10.

Local connections are characterized by having digits 2–9 in the first place of their call numbers. As soon as one of these digits id dialled relay J pulls up over its winding JI since wiper IW1 is set on the contact corresponding to the dialled digit. Relay C energizes over contact 1j and the high resistance Wi9 in the following circuit: earth, 1j, Wi9, I5, contact 34, 2TU, 2tr, 2wr, YI, CI, battery.

Relay Y does not energize. Through contact 3j the rotary magnet MW1 of the discriminator is protected against receiving further dialled impulses. At contacts 1c and 4j the circuit for relays PR and P is opened as relay Z is already energized. Through contact 2c the discriminating selector W1 is brought to the normal position by the energizing of rotary magnet MW1 over the relay interrupter RU. As soon as wiper VW1 reaches the normal position relays J and C deenergize. Through the release of relay PR relay X is energized over battery, Wi4, 3y, 3pr, C, 45u, earth.

Relay WR is energized over contact ix and operates the rotary magnet MS over contact wrX and MS operate as an automatic interrupter so that the auxiliary selector S is brought to the normal position. When wiper VS reaches the zero position relay U is deenergized. Relay P in the calling equipment has deenergized. Relays F and K cannot draw up because relays Y and KR are deenergized. When the group selector is released on replacing the receiver relay ZR energized. The local charge meter OZ energizes over earth, 5t, 1f, 1m, 2zr. After the release of relay T relay AB energizes as already described and over contact 2ab in connection with relays K and HR advances the payment selectors W10 and W50 into positions 24 and 29.

Free calls

Connections which are made free of charge are characterized by a call number having digit 1 as the first digit (for example 1 or 01). The setting up of the connection is the same as for a local call. Since no money has to be inserted the payment selector W10 is advanced from contact 24 to 25 and selector W50 from contact 29 to 30 on the switching over of contacts 1vk and 2vk. Thus the auxiliary selectors in taking up the complementary steps of selectors W10 and W50 has to make a total of 5×5+10=35 steps. Contact 35 of the auxiliary selector S is, however, not connected to a contact of the discriminating selector W1. Contact 1 of the discriminating selector W1 which characterizes the free zone is connected to relay C so that this relay and relay J energize in the following circuit: earth, 1vr, IW1, contact 1 or "01", JIII, CI, battery. Relays C and J lock up over contact 2c in dependence upon wiper VW1. The circuit for relays P and PR is broken by contacts 1c and 4j as in the case of a local connection.

The release operations and the homing of the selectors is effected by the same way as has already been described in the case of a local call. As no charge is being made for the call, relay ZR does not energize on the release of the connection so that the local call meter OZ is prevented from being advanced.

Incoming calls

On the seizing of the calling equipment (Fig. 4) relays R and T are energized. Contacts 1r and 2r switch the line through on one side of the calling equipment while disconnecting relays G10, G50 and H, and contacts 1t and 2t switch the line through on the other side of the calling equipment.

The opening of contacts 3r and 5r prevents rotary magnets M10 and M50 from energizing when relays G10 and G50 deenergize. Relays HR and D are energized over contact 6r. Relay E draws up over contact 3hr. Relay E is slow to operate so that the condenser C3 is shunted by contact 1e only after a definite lapse of time.

Magnet PM was deenergized on the switching over of contacts 1r and 2r so that the bell in the pay station is connected to the line over contact pm. As soon as the person in the paystation removes the receiver, contacts 1vk and 2vk are immediately switched over, as described already with reference to Fig. 1, since magnet PM is not energized. Relay V energizes over contact 4d so that at contacts 3v and 5v relay A and condensers C1 and C2 are cut off from the line. After the energizing of relays E and V the pay station is connected directly to the final selector.

The control of the connection is from the final selector as for a normal station. On the replacement of the receiver the final selector releases, the c-lead is disconnected and relays R and T deenergize. Through the opening of contact 6r relay HR deenergizes. Relay D continues energized over its winding DI, 1ab, 2g, 50, 3g10, 3r. Relay E also remains energized since it locks up in the following circuit: battery, E, 3hr, 2e, 5g50, 3r, earth. After relay T deenergizes, relay AB energizes over earth, 3b, 4d, 3t, AB, battery. AB locks up over its contact 1ab in dependence upon the relays G10 and G50, over 2g50, 3g10, 3r and earth. Relay D now deenergizes. As soon as the normal circuit is set up, after replacement of the receiver and the return of contacts 1vk and 2vk to the normal position, relays G10 and G50 draw up and break the locking circuit for relay AB by opening contacts 2g50 and 3g10.

Fee payment in the case of long distance calls

The distant exchange is called by the calling party free from charge. The switching operations involved have already been described. After stating the desired connection and the call number of the pay station the calling party replaces the receiver. The distant exchange then calls. The operations taking place are those already explained for an incoming call. The operator asks the calling party to pay in the fee corresponding to the connection. Since the contacts 1vk and 2vk have been switched over on taking up the receiver the gong microphone Mg is connected to the line.

The operator can tell the amount of money paid in by the tone produced as the coins strike the gongs. When the correct sum has been paid the calling party is asked to press the metering button 102, by means of which the money is collected. The collecting is also made perceptible by a tone signal 106.

In the case of disagreement as to the amount of money paid in the calling party can retrieve the sum already paid by replacing the receiver.

What is claimed is:

1. In an automatic telephone system, a paystation telephone and an exchange, a line connecting said telephone with the exchange, a switching device at the exchange for determining the fee to be paid for a call, a second switching device at the exchange for extending connections, means responsive to the insertion of coins at the paystation for transmitting impulses over the line to operate said first switching device, means responsive to the operation of the paystation calling device for transmitting impulses over the line to operate said second switching device, and switchover contacts in both ends of said line for connecting the line first between said coin impulse transmitting means and associated switching device and then between said calling device and associated switching device.

2. In an automatic telephone system, a paystation telephone and an exchange, a line extending therebetween, a first and a second switching device at said exchange, means at said paystation responsive to the insertion of coins therein for operating said first switching device over said line, switchover means in said line at the paystation and at the exchange normally connecting said coin means and said first switching device together, means for operating said switchover means, a calling device at said paystation, said calling device and said second switching device connected together by the operation of said switchover means, and means responsive to the operation of said calling device for operating said second switching device over said line.

3. In a system as claimed in claim 2 wherein the switchover means in the line are operated consequent to the operation of the calling device.

4. In a system as claimed in claim 2, a switchhook for the paystation operated responsive to the removal of the telephone receiver, an auxiliary magnet at said paystation operated responsive to the operation of said switchhook, and means for operating the switchover means in said telephone dependent upon the condition of said switchhook, said auxiliary magnet and the calling device of said telephone.

5. In an automatic telephone system, a paystation telephone and an exchange, a line connecting said telephone with said exchange, a pair of switching devices at said exchange, means at said paystation responsive to the insertion of coins therein for operating one of said switching devices over said line, means responsive to the operation of the paystation calling device for operating the other of said switching devices over said line, switchover means located at both ends of said line normally connecting said coin means and said first switching device to the line and in its alternate position connecting the calling device and the second switching device to the line, said switchover means operated in the case of outgoing calls from the paystation by the operation of the calling device and in the case of incoming calls by the removal of the receiver of the telephone.

6. In a paystation telephone set, switchover contacts for controlling the circuit of said telephone, an operating lever for said switchover contacts, a locking lever for holding said operating lever in its normal position, a locking magnet which in its energized condition permits said locking lever to hold said operating lever in its normal position and in its deenergized condition moves the locking lever out of engagement with the operating lever and permits the switchover contacts to operate, and a calling device coupled to said holding lever for operating the same independent of the condition of said locking magnet.

7. In a paystation telephone, a set of switchover contacts for controlling the establishment of a connection, an operating lever for controlling said switchover contacts, a switchhook operated by the telephone receiver, means controlled by the movement of said switchhook for operating said operating lever to operate said switchover contacts, a locking lever for preventing the operation of said operating lever by the operation of said switchhook, a calling device and a magnet, both the calling device and the magnet having means for moving said locking lever to permit said operating lever to be operated by the switchhook to operate said switchover contacts.

8. In a paystation telephone according to claim 7 wherein the magnet operating the locking lever is provided with three different windings of which one high resistance and one low resistance winding are connected in series with one side of the telephone line while the third winding is connected to the other side of the line, means responsive to the operation of said switchhook on an outgoing call for short circuiting said high resistance winding to operate the magnet and prevent the operation of said locking lever until the calling device is operated, said magnet in its deenergized condition holding said locking lever out of engagement of said operating lever to permit operation of said switchover contacts by operation of said switchhook on an incoming call.

9. In a measured service telephone system, a paystation telephone and an exchange, a line connected therebetween, switchover contacts at said telephone for controlling the establishment of telephone connections, relays in said line at the exchange normally energized through said switchover contacts, means for opening said line circuit to deenergize said relays in the establishment of a connection, means for operating said switchover contacts, the operation of said switchover contacts disconnecting said line opening means and said relays from said line, and means for further extending the connections over the operated switchover contacts.

10. In a measured service telephone system, an automatic paystation telephone and an exchange, a line connecting said telephone with the exchange, payment selectors at the exchange connected to said line, means responsive to the insertion of coins at said paystation in accordance with a certain zone called for operating said payment selectors in accordance with the coins deposited, a totaling selector for totaling the sum of the coins deposited, said payment selectors transferring their settings to said totaling selector, a discriminating selector, said discriminating selector operated responsive to the operation of the calling device at the telephone in accordance with the zone called, and means for testing the conformity of the setting of said totaling selector and said discriminating selector.

11. In a measured service telephone system, an automatic paystation telephone, a totaling selector, means responsive to the insertion of coins in said paystation in accordance with a particular zone called for operating said totaling selector correspondingly, a discriminating selector, means responsive to the operation of the calling device in said paystation in accordance with the particular zone called for operating said discriminating selector correspondingly, means for testing the conformity of the setting of both of said selectors, and means in case the settings coincide for permitting the extension of the connection.

12. In a measured service telephone system, an automatic paystation telephone and an exchange, a line extending therebetween, a pair of payment registering selectors at the exchange, means responsive to the insertion of certain coins in said paystation for operating one of said payment selectors in accordance therewith over one side of the line and responsive to the insertion of different coins for operating the other of said payment selectors correspondingly over the other side of said line, a totalizing selector automatically operated in accordance with the settings of both of said payment selectors to register the sum of their settings, a discriminating selector operated responsive to the calling device at the paystation to register the zone in which the connection is to be extended and corresponding to the coins inserted, said discriminating selector and said totalizing selector coinciding when the amount of coins inserted agrees with the zone dialled, and means for preventing the extension of the connection in case the fee deposited and the zone dialled do not agree.

13. In a measured service telephone system as claimed in claim 12 wherein the amount of the coins deposited may be varied according to the time of day by changing the connections from said totalizing selector with said discriminating selector.

14. In a measured service telephone system according to claim 12 wherein a meter is provided at the exchange which is operated by the payment selectors in accordance with their complementary steps corresponding to the coins inserted at the time the payment selectors are restoring to normal.

15. In a measured service telephone system according to claim 14 wherein the payment registering selectors are arranged individual to the paystation line while the discriminating selector and the totaling selector are common to a plurality of lines and revert to normal after the desired connection has been successively established.

16. In a measured service telephone system as claimed in claim 14 wherein in addition to the collection of inserted coins as a fee for the establishment of connections a pair of meters are provided at the exchange, one meter operated when local calls are made and the other meter operated when zone calls are made and completed.

17. In a measured service telephone system, an automatic paystation telephone and an exchange, a line connecting the same, a payment selector at said exchange associated with said line, means responsive to the insertion of coins at said paystation for operating said payment selector over said line in accordance with the value of said coins, a totaling selector at said exchange common to a plurality of paystation lines, a finder switch automatically operated to search for the calling paystation line and associate said totaling selector therewith, means responsive to the operation of the calling device at said paystation in accordance with a particular digit dialled and corresponding to the coins inserted for operating said totaling selector in accordance therewith, and means for testing whether the settings of said totaling selector and said payment selector coincide to enable the connection to be completed.

18. In an automatic telephone system, a paystation telephone and an exchange, a line connecting said paystation with the exchange, a calling device at said telephone having means for transmitting impulses over said line, a switching device operated by said impulses to extend a connection in the exchange, means at said paystation for transmitting impulses over said line responsive to the insertion of coins therein, a second switching device at the exchange operated by the impulses sent by the insertion of coins to register the fee for a call, together with means for switching the line from the switching device controlled by coin impulses to the switching device controlled by the calling device impulses.

19. In an automatic telephone system, a paystation telephone and an exchange, a line connecting the telephone with the exchange, a calling device in said paystation for transmitting impulses to said exchange to extend a connection to a desired subscriber, a discriminating switch at the exchange also operated by said impulses, a plurality of coin contacts at said paystation each operated momentarily by the passage of corresponding coins, coin relays at said exchange each responsive to the operation of an associated coin contact, a coin switch operated by said coin relays, and means for preventing the extension of the call in case the positions to which said discriminating switch and said coin switch are operated do not coincide.

FRITZ APPELIUS.
HEINRICH LANGNER.